W. Godsoe.

Steering.

No. 983.

Reissued Jun. 12, 1860.

Witnesses:

Thos. Glover

P. E. Tonkenmacher

Inventor:

Wm Godsoe.

N. PETERS, PHOTO-LITHOGRAPHER, WASHINGTON, D. C.

UNITED STATES PATENT OFFICE.

WILLIAM GODSOE, OF MANCHESTER, MASSACHUSETTS, ASSIGNOR TO HIMSELF AND ISAAC AYERS.

IMPROVED STEERING APPARATUS.

Specification forming part of Letters Patent No. 24,351, dated June 7, 1859; Reissue No. 983, dated June 12, 1860.

*To all whom it may concern:*

Be it known that I, WM. GODSOE, of Manchester, in the county of Essex and State of Massachusetts, have invented an Improved Mechanical Steerer for Vessels; of which the following is a full, clear, and exact description, reference being had to the accompanying drawings, making part of this specification, in which—

Figure 1:
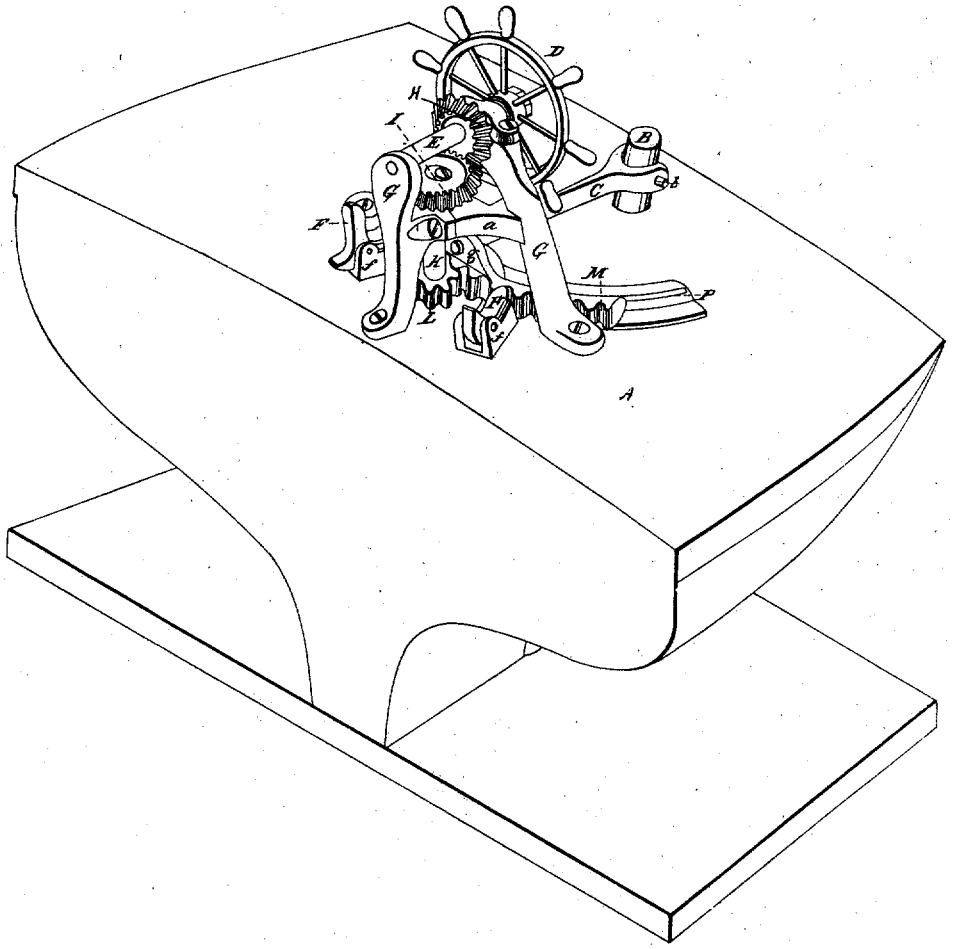
Figure 2:
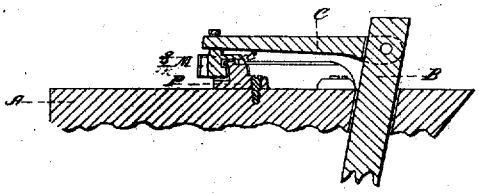

Figure 1 is a perspective view of my proposed steerer; Fig. 2, a detail to be referred to hereinafter.

My present invention consists in a steering apparatus in which a toothed segment connected with the rudder-head and traversing on a suitable way is operated by the steering-wheel through the intervention of suitable gearing.

That others skilled in the art may understand and use my invention, I will proceed to describe the manner in which I have carried it out.

In the said drawings, A represents the deck of a vessel; B the rudder-post, C′, the tiller; D, the steering-wheel, the shaft E of which runs in suitable bearings in a heavy frame, G, rising from the deck. A bevel-gear, H, on the shaft E engages with a similar gear I on the head of a vertical shaft, K, which has its bearings in the cross brace *a* of the frame G. This latter shaft also carries at its lower end a pinion, L, which engages with a toothed segment, M, which slides on a curved way, P, attached to the deck A, so that as the shaft K is revolved by the wheel D the segment M is caused to move laterally toward one end or the other of the way P. The segment M slides in a groove in the way P, as shown in section Fig. 2. It also has one or more hooks or clamps, *c*, which project from it and extend over the top of the way to keep the segment and way in contact, (or for this purpose the segment may run in a dovetail groove in the way.) An ear, *g*, rises from the top of the segment M in the middle of its length, into which is inserted the end of the tiller C′, the other end of which is connected with the head of the rudder-post by a pin, *b*, passing through the forked end of the tiller and through the post B.

I have here shown a simple way of connecting the segment M with the rudder-post; but it is evident that other means may be used without departing from the spirit of my invention. For example, the segment M may form part of a quadrant-shaped frame the radii of which will center in a cross fitting on the head of the rudder-post. I however prefer the first-described arrangement, as it allows the rudder-post to be lifted vertically a short distance, as it is liable to be by the sea, without communicating the strain directly to the segment M and pinion L, as it would do with the latter arrangement.

The traversing segment M offers peculiar facilities for securing the rudder in any position when it is necessary for the helmsman to leave the wheel or when the vessel is riding at anchor. For this purpose I employ the dogs F F′, which are pivoted to blocks *f*, secured to the deck. These dogs, when dropped down, as shown at F′, fall between two teeth of the segment M and secure it; or a straight pin may be thrust down between two teeth into a hole in the deck.

What I claim as my invention, and desire to secure by Letters Patent, is—

The above described steering apparatus, consisting, essentially, of the toothed segment M, traversing on the curved way P, and operating substantially as described.

WILLIAM GODSOE.

In presence of—
JOHN LEE,
JOHN C. WEBB.